United States Patent [19]

Solimine et al.

[11] Patent Number: 5,321,237
[45] Date of Patent: Jun. 14, 1994

[54] DEVICE AND METHOD FOR AUTHENTICATING ELECTRONIC DOCUMENT TRANSMISSIONS

[76] Inventors: Philip A. Solimine; Glen P. Solimine, both of 306 Tuxedo Pl., Hawthorne, N.Y. 10532

[21] Appl. No.: 706,151
[22] Filed: May 28, 1991
[51] Int. Cl.⁵ .................. H04N 1/06; H04N 1/387
[52] U.S. Cl. .......................... 235/375; 358/400
[58] Field of Search .................. 235/375; 358/400

[56] References Cited

U.S. PATENT DOCUMENTS

| | | | |
|---|---|---|---|
| 4,900,902 | 2/1990 | Sakakibara | 235/375 |
| 4,901,068 | 2/1990 | Benton et al. | 235/382 |
| 4,926,325 | 5/1990 | Benton et al. | 340/825.33 |
| 5,003,405 | 3/1991 | Wulforst | 358/400 |

*Primary Examiner*—John Shepperd
*Attorney, Agent, or Firm*—St. Onge Steward Johnston & Reens

[57] ABSTRACT

A device for authenticating and verifying the originator of an electronic document transmission. A card reader is disposed at a transmitting station and an originator verifier is disposed at a receiving station. The originator verifier produces original markings on the document produced at the receiving station in response to a signal generated by the card reader at the transmitting station.

4 Claims, 2 Drawing Sheets

DEVICE AND METHOD FOR AUTHENTICATING ELECTRONIC DOCUMENT TRANSMISSIONS

BACKGROUND OF THE INVENTION

The present invention generally relates to electronic data interchange and electronic document transmission apparatus such as computers and facsimile machines. More specifically, this invention relates to a device and method for authenticating and verifying the originator of an electronic document transmission. "Document" as used in the present disclosure includes both hard-copy productions of information on paper and electronic productions of information on a computer screen.

Electronic data interchange is emerging as a standard part of business operations. Since an electronic transmission of a document is a reproduction of the original document, authentic markings, for example a signature, cannot be transmitted. Thus, the veracity of a transmitted document may be questioned. The inability to authenticate a signature limits the usefulness of facsimile machines had the like for numerous business transactions. Therefore, there is a need in the art of electronic data interchange for means to authenticate and verify the origin and veracity of electronic document transmissions.

To the Applicants' knowledge no device or apparatus is disclosed in the prior art for authenticating electronic data transmissions. Presently, verification of an electronic document transmission is generally limited to an acknowledgment of a completed transmission by production of a separate record. However, the prior art does not disclose means to associate the acknowledged transmission with a particular originator. Additionally, the prior art does not disclose means to verify the text of a transmitted document.

SUMMARY OF THE INVENTION

The present invention discloses a device and method for authenticating and verifying the originator of an electronic document transmission. The device produces original markings on the document at a receiving station by means controlled by the transmitting party at a transmitting station.

The device generally comprises a magnetic card reader disposed at a transmitting apparatus and an originator verifier disposed at a receiving apparatus. In practice a card reader and an originator verifier would be disposed at each of the respective transmitting and receiving apparatuses. The card reader includes means to read data stored on a magnetic card, means to input data into the card reader, and means to compare the stored data with the inputted data, as generally known and used in automatic teller machines (ATMs). The card reader of the present invention further includes signaling means for activating the originator verifier disposed at a receiving apparatus. The originator verifier comprises means responsive to the signal from the card reader for printing a code or other identifying data on a document produced at the receiving apparatus. In a preferred embodiment of the present invention the originator verifier includes means to affix a stamp to the received document and print identifying data thereon. The device of the present invention may be built-in or peripheral equipment for an electronic data transmission apparatus.

An object of the present invention is to provide means to verify the originator of an electronic document transmission.

Another object of this invention is to provide means to authenticate an electronically-transmitted document as an original.

A further object of the present invention is to provide an electronic notary public.

These and other objects and advantages of the present invention will be apparent to those skilled in the art from the following description of preferred embodiments, claims and appended drawings.

DESCRIPTION OF PREFERRED EMBODIMENTS

Figure 1:
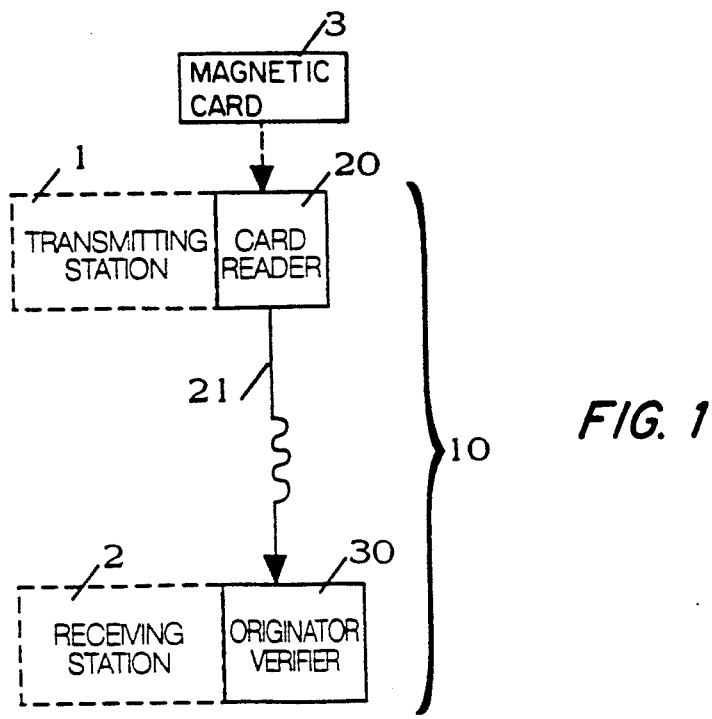
FIG. 1 is a schematic block diagram of the device of the present invention.

FIG. 1 illustrates in a schematic block diagram a first preferred embodiment of the authentication and verification device 10 for electronic document transmissions in accordance with the teachings of the present invention. First authentication and verification device 10 generally comprises two components: a card reader 20 and an originator verifier 30. Card reader 20 is disposed at a transmitting station 1, for example a first facsimile machine, and the originator verifier 30 is disposed at a receiving station 2, for example a second facsimile machine. Card reader 20 is preferably accessed by secured means, for example by inserting into card reader 20 a magnetic card 3 of the type generally known in the art and used in automatic teller machines. A signal 21 is generated by selective operations of the card reader 20 and originator verifier 30 is activated in response to the signal 21 from the card reader 20. Originator verifier 30 produces original markings on the document produced at the receiving station 2 in a manner identifying the originator of the transmission.

It should be understood by those skilled in the art that various means of accessing card reader 20 may be utilized without departing from the spirit and scope of the present invention. For example, unsecured access means such as a button switch may be utilized to generate signal 21 for activation of originator verifier 30, or other secured access means such as a lock/key assembly, a thumbprint reader or mechanical input of a series of predetermined numerical or alphabetic key pad operations, for examples, are equally suitable for generating signal 21. Originator verifier 30 may likewise comprise various means of producing original markings on the document produced at receiving station 2 which identify the originator of an electronic document transmission, for examples, punched holes, printing means, stamp affixation means, and auditory and visual electronic identifying means.

Figure 2:
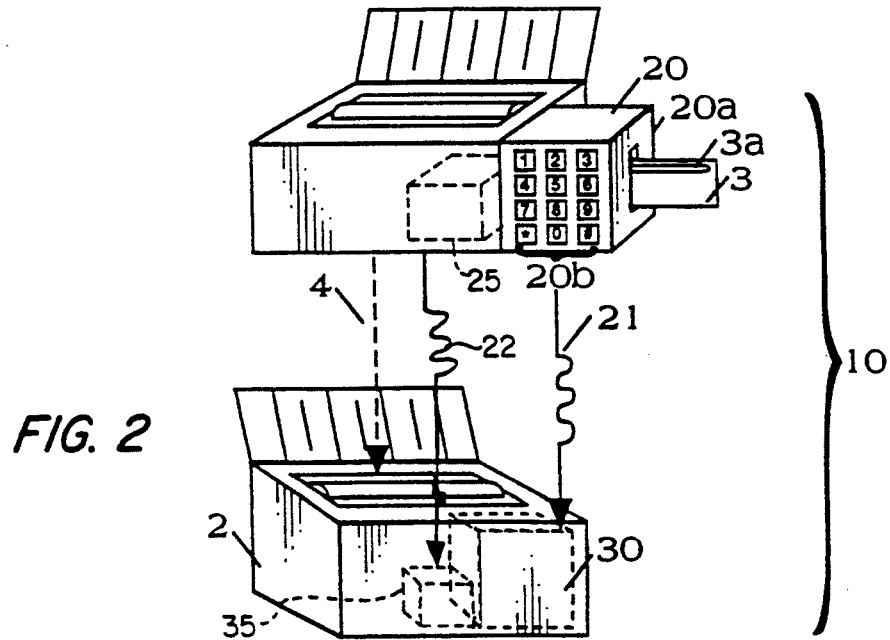
FIG. 2 is a front perspective view of a pictorial representation of a first preferred embodiment of a transmitting station and a receiving station constructed in accordance with the teachings of the present invention.

FIG. 2 illustrates a front perspective view of a pictorial representation of the first preferred embodiment of the authentication and verification device 10 shown having the card reader 20 and the originator verifier 30 respectively attached to a first facsimile machine 1 (the transmitting station) and a second facsimile machine 2 (the receiving station). The respective facsimile machines 1 and 2 operate as known in the art for document transmission, a "fax signal" 4 communicating between the first facsimile machine and the second facsimile machine 2. An authenticating and verifying signal 21 communicates between the card reader 20 and the originator verifier 30.

Card reader 20 includes a slot 20a for receipt of a magnetic card 3. The magnetic card 3 has data stored on a magnetic strip 3a on one face of the card as known in the art. Card reader 20 further includes a conventional twelve-digit key pad 20b disposed on a forward face of the card reader 20. Logic circuitry well known in the art for comparison of data stored on the strip 3a of the card 3 and data input into card reader 20 by means of key pad 20b is included in card reader 20 to generate the authenticating and verifying signal 21. Said authenticating and verifying signal 21 activates operation of the originator verifier 30.

First authentication and verification device 10 further includes a first document reader 25 and a second document reader 35 respectively disposed at the respective stations 1 and 2. First and second document readers 25 and 35 communicate by means of reader signal 22, said reader signal 22 being activated by card reader 20. Document readers 25 and 35 provide means to verify the text of a transmitted document as hereinafter described in greater detail. Document readers 25 and 35 preferably comprise optical readers which read the text of the transmitting document and the received document, respectively. Thus, the logic circuitry in card reader 20 includes appropriate means as known in the art to compare the text read by first document reader 25 at the transmitting station 1 and the text read by second document reader 35 at the receiving station 2, and means to permit generation of verifying signal 21 only when the text is the same at both stations 1 and 2, thereby providing an additional measure of the veracity of the document produced at receiving station 2.

Figure 3:
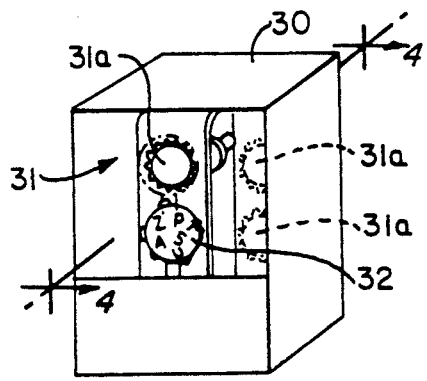
FIG. 3 is a rear perspective view of a first preferred embodiment of the originator verifier of the present invention.
Figure 4:
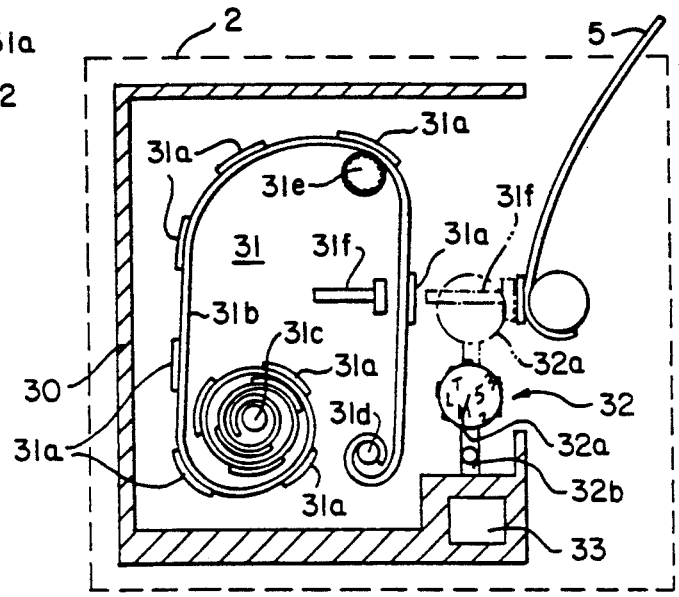
FIG. 4 is a cross-sectional view of the first originator verifier taken along line 4—4 of FIG. 3.

A first preferred embodiment of the originator verifier 30 is illustrated in FIGS. 3 and 4. First originator verifier 30 includes stamp affixation means 31 and document printing means 32. In response to the signal 21 generated by card reader 20 at the first facsimile machine 1 stamp affixation means 31 is activated to cause affixation of a stamp 31a to a portion the document 5 produced at the second facsimile machine 2 and/or document printing means 32 is activated to cause the printing of predetermined or selective identifying data on a portion of document 5.

As can be best seen in the cross-sectional view of first originator verifier 30 illustrated in FIG. 4 stamp affixation means 31 includes a plurality of stamps 31a disposed in spaced relationship on a ribbon 31b. Stamps 31a have glue means disposed on one side thereof and are preferably perforated about the respective edges thereof for easy removal from ribbon 31b and affixation to a document 5 as hereinafter described in greater detail. Ribbon 31b is attached at one end to a ribbon outlet spool 31c and at the opposite end to a ribbon uptake spool 31d. Ribbon 31b is selectively fed from outlet spool 31c to uptake spool 31d by means of feed gear 31e. Stamp affixation means 31 further includes a pestle 31f which moves from a first position, illustrated by solid lines, to a second position, illustrated by phantom lines, to remove a stamp 31a from ribbon 31b and affix the stamp 31a to a document 5. Document printing means 32 preferably includes a typing ball 32a which is attached to a ball arm 32b which causes typing ball 32a to be selectively moved from a first position illustrated by solid lines, to a second position, illustrated by phantom lines. Appropriate circuitry 33 is included in first originator verifier 30, for example a microprocessor, to instruct the operation of stamp affixation means 31 and document printing means 32 in accordance with signal 21.

Figure 5:
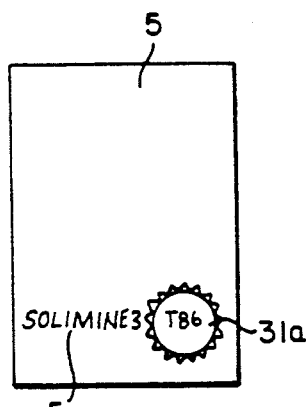
FIG. 5 is a front plan view of a document illustrating the original markings produced by the first originator verifier.

FIG. 5 illustrates a plan view of a authenticated and verified document 5 produced by operation of the first originator verifier 30 of the present invention. Stamp 31a is affixed to a portion of document 5 and identifying data 5a is printed on a portion of the document 5. It is preferred that the identifying data 5a produced by the document printing means 32 of first originator verifier 30 extends over a portion of the document 5 and the stamp 31a. In the illustration of FIG. 5 identifying data 5a can be seen to include a combination of alphabetic and numerical characters.

Figure 6:
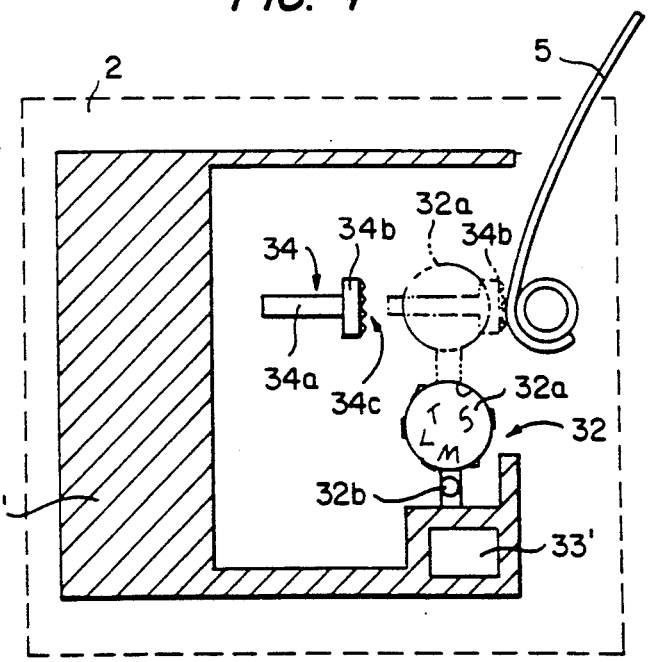
FIG. 6 is a cross-sectional view of a second preferred embodiment of the originator verifier of the present invention.

FIG. 6 illustrates in a cross-sectional view a second preferred embodiment of an originator verifier 30' in accordance with the teachings of the present invention. Second originator verifier 30' includes a punch 34 having a punch arm 34a and a punch head 34b providing means to make holes in a document 5. Raised protrusions 34c are formed on the punch head 34b which cut the holes in document 5. Preferably the raised protrusions 34c spell "VERIFIED" or other suitable language to indicate an authenticated and verified document 5. Punch 34 moves from a first position, illustrated by solid lines, to a second position, illustrated by phantom lines, to engage the document 5. Second originator verifier 30' also includes document printing means 32 as heretofore described for the first originator verifier 30 for the production of identifying data 5a. Appropriate circuitry 33' is included in second originator verifier 30' to instruct the operation of punch 34 and document printing means 32 in accordance with signal 21.

Figure 7:
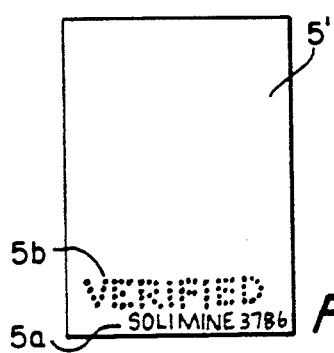
FIG. 7 is a front plan view of a document illustrating the original markings produced by the second originator verifier.

FIG. 7 illustrates a plan view of a second authenticated and verified document 5' produced by operation of the second originator verifier 30' of the present invention. Punched holes 5b are formed in a portion of document 5' and identifying data 5a is printed on a portion of the document 5'.

Operation of the device 10 of the present invention should be readily understood from the foregoing description of its structure. For use as a notary, the device 10 may be operated in either of two manners. A person authorized by a state to serve as a notary public may have a coded magnetic card 3, for example, and upon affixing the notary stamp and signature as presently done, the person can then access the device 10 to authenticate and verify a transmitted document 5. Alternatively, the device 10 may serve as an electronic notary, replacing the authorized person and permitting the originator of the document to authenticate and verify the electronic transmission electronically.

Various changes, modifications and additions may be made to the present invention as described without departing from its spirit and scope. Such changes, modifications and additions within a fair reading of the appended claims are intended as part of the present disclosure.

Therefore, in view of the foregoing we claim:

1. A device for authenticating a transmitted document comprising:
    a transmitting station for transmitting a document;
    means for generating a signal indicative that the originator of the transmission is an authorized user of said transmitting station;
    a receiving station for receiving the document, said receiving station including means for reproducing the transmitted document; and
    means, responsive to the authorized user indicative signal, for authenticating the reproduced document by marking the reproduced document to identify the authorized user.

2. The device of claim 1 wherein said authorized user signal generating means is actuated by means for confirming the identity of the authorized user.

3. The device of claim 2 wherein said authorized user identity confirming means comprises a card reader for reading a number from an authorized user's card, a keyboard for entry of an authorized user's PIN, and means for comparing the number with the PIN and if they match for actuating said authorized user signal generating means.

4. The device of claim 2 wherein said authorized user signal generating means includes a transmitter for transmitting the generated authorized user signal, and wherein said marking means includes a receiver for receiving the transmitted authorized user signal.

* * * * *